United States Patent
Mitra et al.

(10) Patent No.: US 12,445,869 B2
(45) Date of Patent: Oct. 14, 2025

(54) METHOD AND SYSTEM FOR USING A DIGITAL TWIN OF A MOBILE NETWORK TO PROVIDE ENERGY EFFICIENCY

(71) Applicant: Dell Products L.P., Round Rock, TX (US)

(72) Inventors: Jeebak Mitra, Ottawa (CA); Gwenael Poitau, Montreal (CA); Ibrahim Abu Alhaol, Nepean (CA); Javad Mirzaei, Toronto (CA)

(73) Assignee: Dell Products L.P., Round Rock, TX (US)

( * ) Notice: Subject to any disclaimer, the term of this patent is extended or adjusted under 35 U.S.C. 154(b) by 349 days.

(21) Appl. No.: 18/334,753

(22) Filed: Jun. 14, 2023

(65) Prior Publication Data

US 2024/0422577 A1  Dec. 19, 2024

(51) Int. Cl.
*H04W 24/02* (2009.01)
*H04W 52/02* (2009.01)

(52) U.S. Cl.
CPC ....... *H04W 24/02* (2013.01); *H04W 52/0203* (2013.01)

(58) Field of Classification Search
CPC .......................... H04W 24/02; H04W 52/0203
USPC ......................................................... 370/328
See application file for complete search history.

(56) References Cited

U.S. PATENT DOCUMENTS

| | | | | |
|---|---|---|---|---|
| 11,296,963 | B1* | 4/2022 | Yang | H04L 41/149 |
| 2008/0279152 | A1* | 11/2008 | Kim | H04W 36/04 |
| | | | | 370/331 |
| 2013/0310048 | A1* | 11/2013 | Hunukumbure | H04W 52/0206 |
| | | | | 455/443 |
| 2014/0222997 | A1* | 8/2014 | Mermoud | H04L 41/147 |
| | | | | 709/224 |
| 2016/0021011 | A1* | 1/2016 | Vasseur | H04W 72/52 |
| | | | | 370/235 |
| 2019/0319868 | A1* | 10/2019 | Svennebring | H04W 24/08 |
| 2022/0201625 | A1* | 6/2022 | Meyuhas | H04B 1/3838 |
| 2022/0312267 | A1* | 9/2022 | Narath | H04W 28/12 |
| 2023/0102489 | A1* | 3/2023 | Hu | H04W 28/08 |
| | | | | 370/329 |
| 2023/0134583 | A1* | 5/2023 | Kim | H04W 24/02 |
| | | | | 370/235 |
| 2023/0239784 | A1* | 7/2023 | Zhang | H04W 52/0206 |
| | | | | 370/318 |
| 2024/0386277 | A1* | 11/2024 | Suzuki | G06N 3/006 |

(Continued)

*Primary Examiner* — Mark G. Pannell
(74) *Attorney, Agent, or Firm* — Chamberlain, Hrdlicka, White, Williams & Aughtry; Aly Z. Dossa

(57) ABSTRACT

A system for enhancing an energy efficiency of a mobile network includes a digital twin connected to the mobile network. The digital twin is programmed to: receive, from the mobile network, real-time network traffic data and base station data of base stations operating in the mobile network; generate a first prediction of network traffic at a first time-scale based on the real-time network traffic data; generate a second prediction of network traffic at a second time-scale based on the real-time network traffic data and the base station data; and generate a first power consumption prediction for the mobile network based on the first prediction, the second prediction, and a topology of the mobile network, and the digital twin emulates at least a portion of the mobile network.

20 Claims, 11 Drawing Sheets

(56) References Cited

U.S. PATENT DOCUMENTS

2024/0422687 A1* 12/2024 Thubert ............ H04W 52/0216
2025/0227742 A1*  7/2025 Alzenad ................ H04W 24/08

* cited by examiner

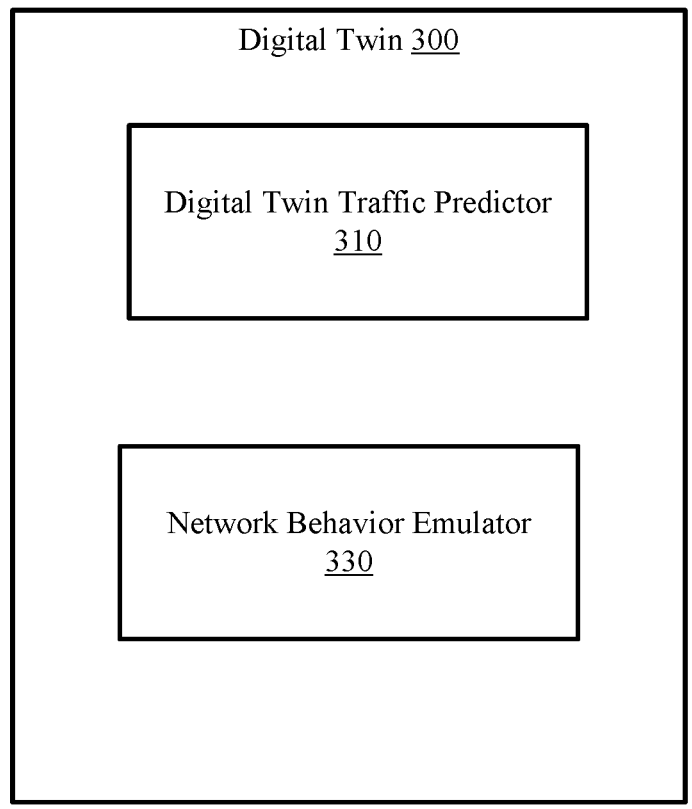
FIG. 3.1

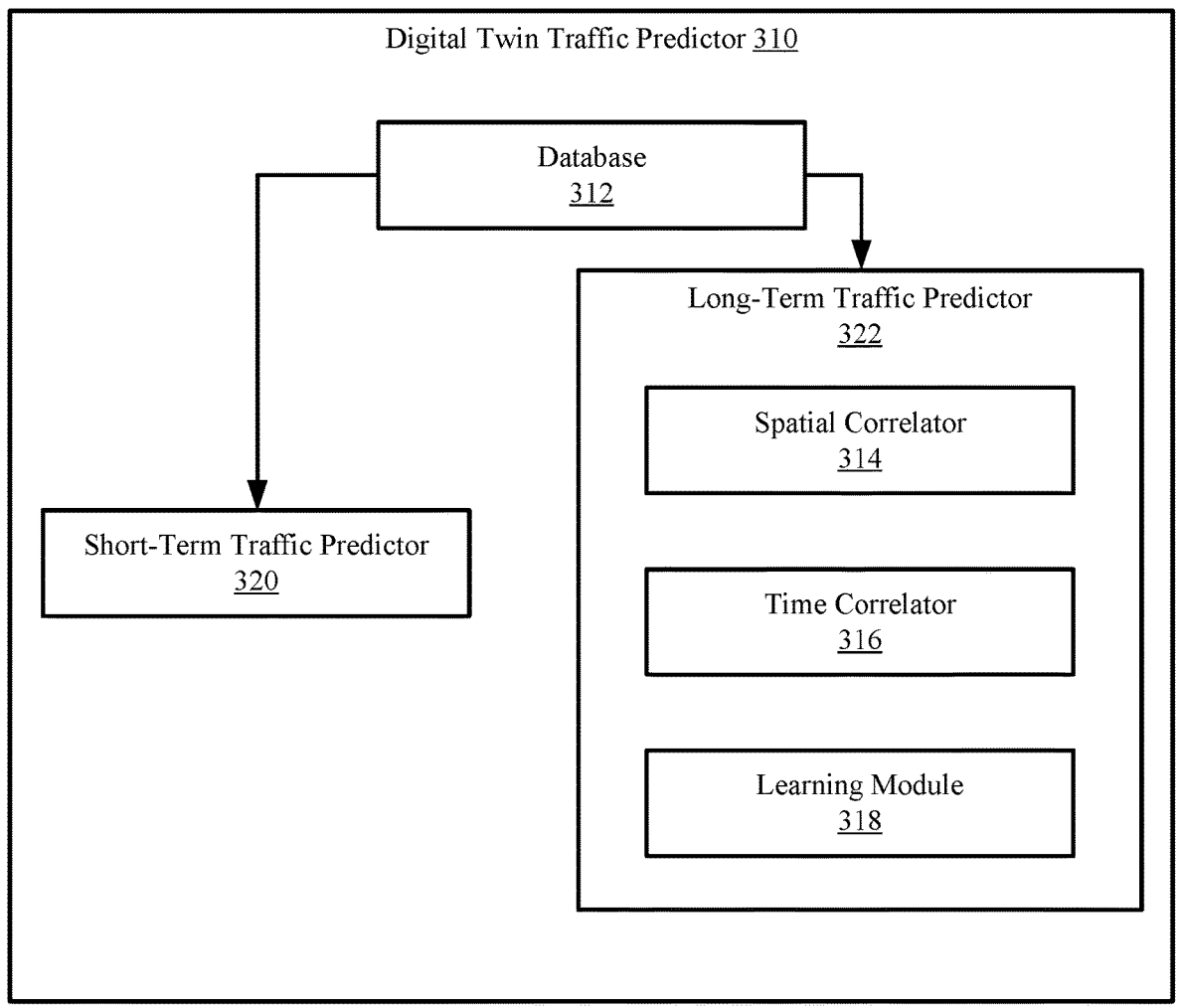
FIG. 3.2

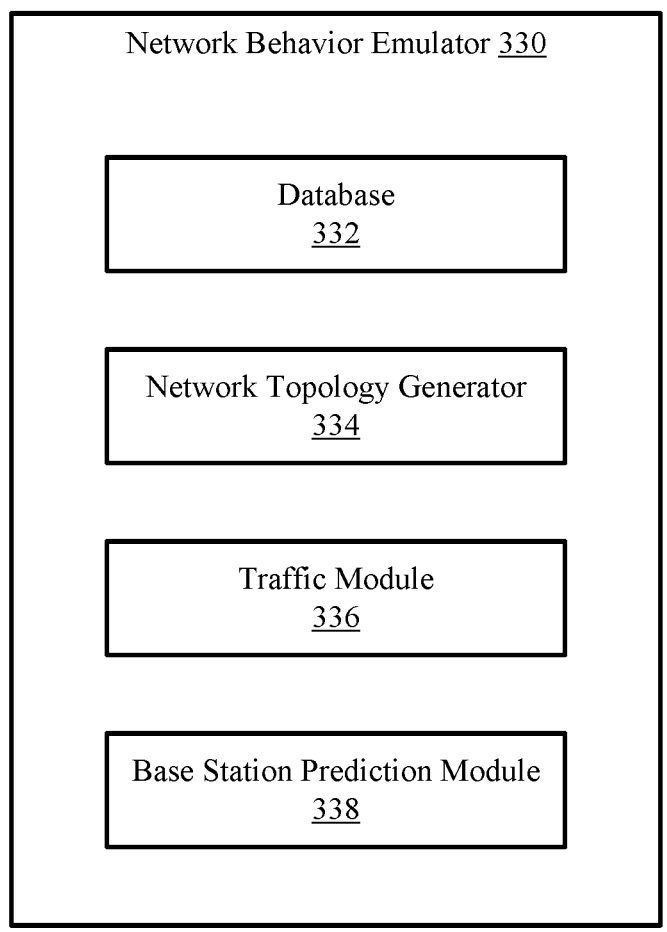
FIG. 3.3

US 12,445,869 B2

METHOD AND SYSTEM FOR USING A DIGITAL TWIN OF A MOBILE NETWORK TO PROVIDE ENERGY EFFICIENCY

BACKGROUND

Computing devices may provide services. To provide the services, the computing devices may include hardware components and software components. The software components may store information usable to provide the services using the hardware components.

SUMMARY

In general, embodiments described herein relate to system for enhancing an energy efficiency of a mobile network. The system includes a digital twin connected to the mobile network. The digital twin is programmed to: receive, from the mobile network, real-time network traffic data and base station data of base stations operating in the mobile network; generate a first prediction of network traffic at a first time-scale based on the real-time network traffic data; generate a second prediction of network traffic at a second time-scale based on the real-time network traffic data and the base station data; and generate a first power consumption prediction for the mobile network based on the first prediction, the second prediction, and a topology of the mobile network. The digital twin emulates at least a portion of the mobile network.

In general, embodiments described herein relate to a method for enhancing an energy efficiency of a mobile network using a digital twin. The method includes receiving, at the digital twin, network traffic data and base station data of a plurality of base stations of the mobile network. The method also includes computing, by the digital twin, a spatial correlation of traffic demand based on the network traffic data. Further, the method includes computing, by the digital twin, a time correlation of traffic demands based on the network traffic data. In addition, the method includes generating, by the digital twin, a first prediction of network traffic at a first time-scale based on the spatial correlation and the time correlation. Moreover, the method includes generating, by the digital twin, a second prediction of network traffic at a second time-scale based on the network traffic data and the base station data, and the second time-scale is different than the first-time scale. Also, the method includes performing, based on the first prediction and the second prediction, an energy efficiency enhancement action from an action set.

In general, embodiments described herein relate to a method for enhancing an energy efficiency of a mobile network using a digital twin. The method includes receiving, at the digital twin and from the mobile network, real-time network traffic data and base station data of base stations of the mobile network, and the digital twin emulates at least a portion of the mobile network. The method also includes generating, by the digital twin, predictions of network traffic, and each of the predictions is at a different time-scale and each is based on the real-time network traffic data. Further, the method includes performing, based on the plurality of predictions, an energy efficiency enhancement action from an action set.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIG. 3.1 shows a diagram of a digital twin in accordance with one or more embodiments.

FIG. 3.2 shows a diagram of a digital twin traffic predictor in accordance with one or more embodiments.

FIG. 3.3 shows a diagram of a network behavior emulator in accordance with one or more embodiments.

DETAILED DESCRIPTION

Figure 1:
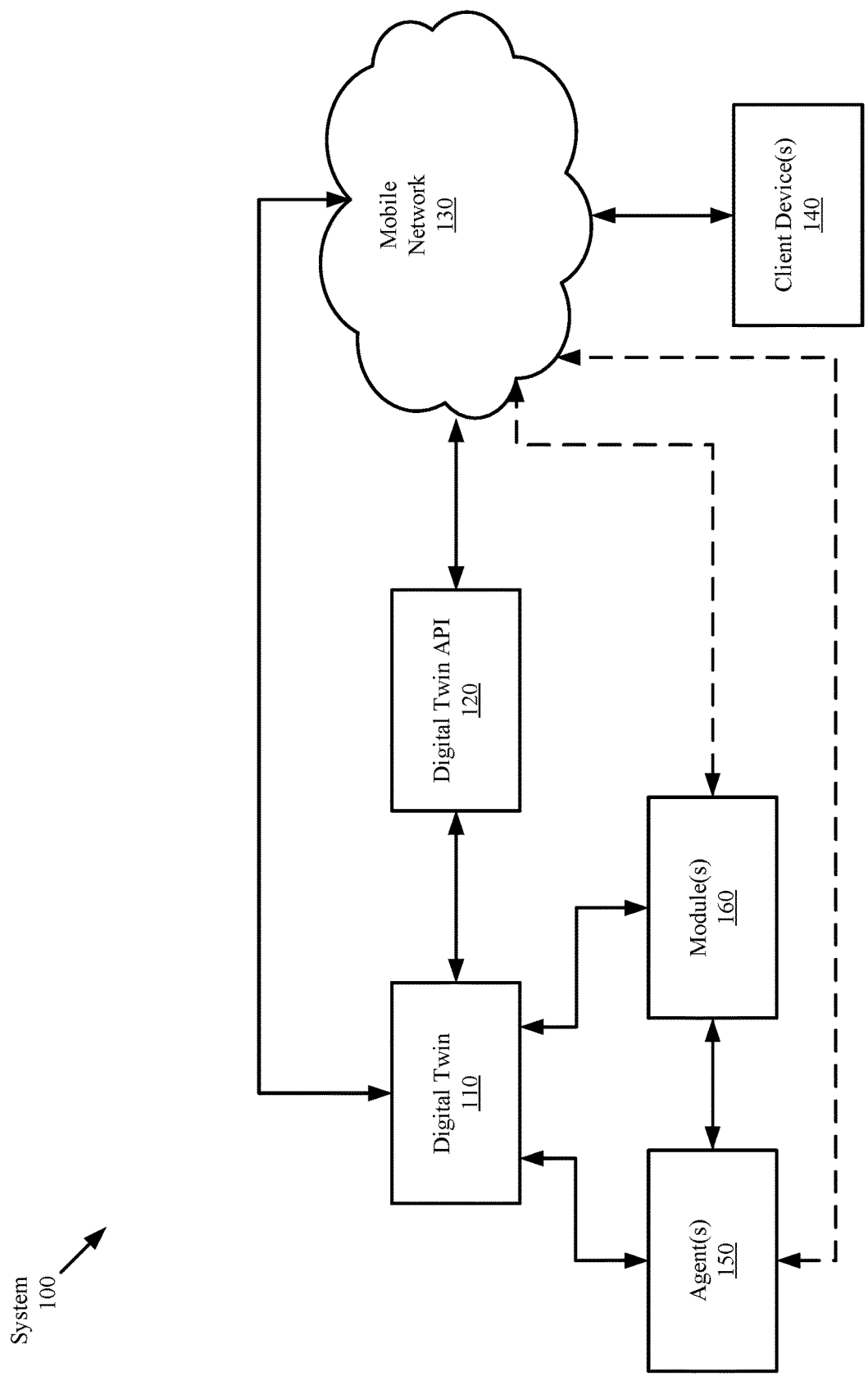
FIG. 1 shows a diagram of a system in accordance with one or more embodiments.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrases connected, operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered a connection and/or an operative connection.

In general, mobile networks are used to provide wireless data connections to client devices. As the capabilities of mobile networks expand, so does the energy consumption associated with the mobile networks. In particular, mobile networks are experiencing an exponential increase in the number of devices connecting to the mobile networks. To handle this additional demand, mobile networks are experiencing a corresponding exponential increase in the operational complexity due to implementation of advanced features that accommodate this increased demand. Further, new frequency bands are being made available for mobile network operations that further increase the energy demands as compared to traditional frequency bands that have narrower cell bandwidth. Therefore, the energy demands of mobile networks is increasing at a rapid rate.

As such, increasing the energy efficiency of mobile networks may be beneficial. One manner in which the energy efficiency may be enhanced is to reduce the energy used by radio access networks (RANs) wirelessly transmitting and receiving signals that provide the wireless connections in mobile networks. However, the energy consumed by a RAN directly corresponds to the RAN's ability to provide wireless communications. Further, the RANs take a period of time to switch to an operational state that requires less energy from an operational state that requires more energy. In some cases, the lower energy state may also have reduced functionality. As such, some amount of prediction is needed to operate RANs in a manner that provides proper connectivity to client devices while also decreasing the energy consumed by the RANs.

Embodiments herein relate to methods and systems that provide a digital twin that is useable to enhance the energy efficiency of mobile networks. For instance, a digital twin may be utilized to predict network traffic across a mobile network, emulate the traffic on a network emulator, and adjust an operation of a portion of the mobile network accordingly.

The following describes various embodiments of the invention.

FIG. 1 shows a diagram of a system (100) in accordance with one or more embodiments. The system (100) includes any number of client devices (140), a digital twin (110), a digital twin application program interface (API) (120), a mobile network (130), any number of agents (150), and any number of modules (160). The system (100) may include additional, fewer, and/or different components without departing from the scope of the embodiments disclosed herein. Each component may be operably connected to any of the other components via any combination of wired and/or wireless connections. Each component illustrated in FIG. 1 is discussed below.

In one or more embodiments, the client device(s) (140), the digital twin (110), the digital twin API (120), the mobile network (130), any number of agents (150), and any number of modules (160) may be physical devices, logical devices, and/or any number of distributed physical and/or logical devices, as discussed below. The mobile network (130) may be operably connected to the digital twin (110) via the digital twin API (120), in which the digital twin API (120) may enable the mobile network (130) (e.g., components of the mobile network (130)) to communicate with the digital twin (110) (e.g., components of the digital twin (110)).

As used herein, "communication" may refer to simple data passing, or may refer to two or more components coordinating a job.

As used herein, the term "data" is intended to be broad in scope. In this manner, that term embraces, for example (but not limited to): data segments that are produced by data stream segmentation processes, data chunks, data blocks, atomic data, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the disclosure are not limited to any particular form of representing and storing data or other information. Rather, such principles are equally applicable to any object capable of representing information.

In one or more embodiments, the mobile network (130) provides wireless communication services to the client devices (140). For example, the mobile network (130) may enable client devices (140) to wirelessly communicate with each other and/or other devices (not shown). In one or more embodiments, the mobile network (130) includes any combination of telecommunication networks that provide connectivity services via a combination of radio signals and wired connections. For example, the mobile network (130) may include any combination of wide area networks (WAN), RAN, third generation (3G) networks, fourth generation (4G) networks, fifth generation (5G) networks, and/or any other mobile network.

In one or more embodiments, the digital twin (110) provides a virtual emulator of the mobile network (130) to provide a risk-free environment to explore novel schemes for improving energy efficiency and evaluate the performances of the novel schemes prior to real-world deployment. The digital twin (110) is a virtual representation of the mobile network (130) which may communicate with the mobile network (130) to obtain real-time data and thus mimic various changes occurring within the mobile network (130) as they happen. As described in greater detail below, the digital twin (110) may be utilized to determine changes to the mobile network (130) that enable the mobile network (130) to operate in a more energy efficient manner.

In one or more embodiments, the digital twin API (120) serves as an intermediary between the digital twin (110) and the mobile network (130) to enable the digital twin (110) and the mobile network (130) to efficiently communicate with one another. In one or more embodiments, the digital twin API (120) is an API and the digital twin (110) sends requests (e.g., API call) and a type of a request (e.g., a "get" request, a "delete" request, an "update" request, a "post" request, etc.) to the digital twin API (120) to receive from the mobile network (130), via the digital twin API (120), a response to the request (e.g., a response to an API call). The response may include data corresponding to: a response time for the request, network traffic data, base station data, mobile network device information, device connectivity information, mobile network topology information, etc. As such, the digital twin API (120) enables the digital twin (110) to extract information from the mobile network (130) and enable the digital twin (110) to digitally emulate the mobile network (130) using real data in real-time or near real-time.

As used herein, an "API" represents a collection of methods and procedures (e.g., retrieving information about an API source, updating the API source, etc.) that define how applications or computing devices can connect to and communicate with each other. The collection of methods and procedures may be designed and configured to facilitate a computing device's connection (e.g., access) to one another. In general, the computing device performing the accessing is called "the client", and the computing device containing a resource is called "the server".

As used herein, an "API call" may refer to a process of an application or a computing device submitting a request to an API (e.g., a component that acts as the "front door" for applications to access data and/or functionality from back-end services) to retrieve the requested data from an external application or an external computing device.

In one or more embodiments, the agents (150) and/or the modules (160) provide supporting functions for the digital twin (110). In doing so, the agents (150) and/or the modules (160) may include one or more separate agents and/or modules, each performing different functions and/or distributing a function across multiple agents (150) and/or the modules (160). Further, the agents (150) and/or the modules (160) may operatively connect to the digital twin (110) and/or the mobile network (130) to provide their respective functionality. In one or more embodiments, the agents (150) and/or the modules (160) provide: network data, energy consumption information, network policy information, historical network information, quality of service information, etc. The various agents (150) and/or the modules (160) and the functionality provided by each is described in further detail below.

In one or more embodiments, the client devices (140) operatively connect to the mobile network (130) to receive data services. To that end, the client devices (140) may include any number and type of computing device. In addition, the client devices (140) may include mobile devices that are operatively connected to different portions of the mobile network (130) at different times, depending on the current location of the client devices (140). As such, any prediction of a client device's (140) use of the mobile network (130) includes spatial and temporal considerations.

Figure 9:
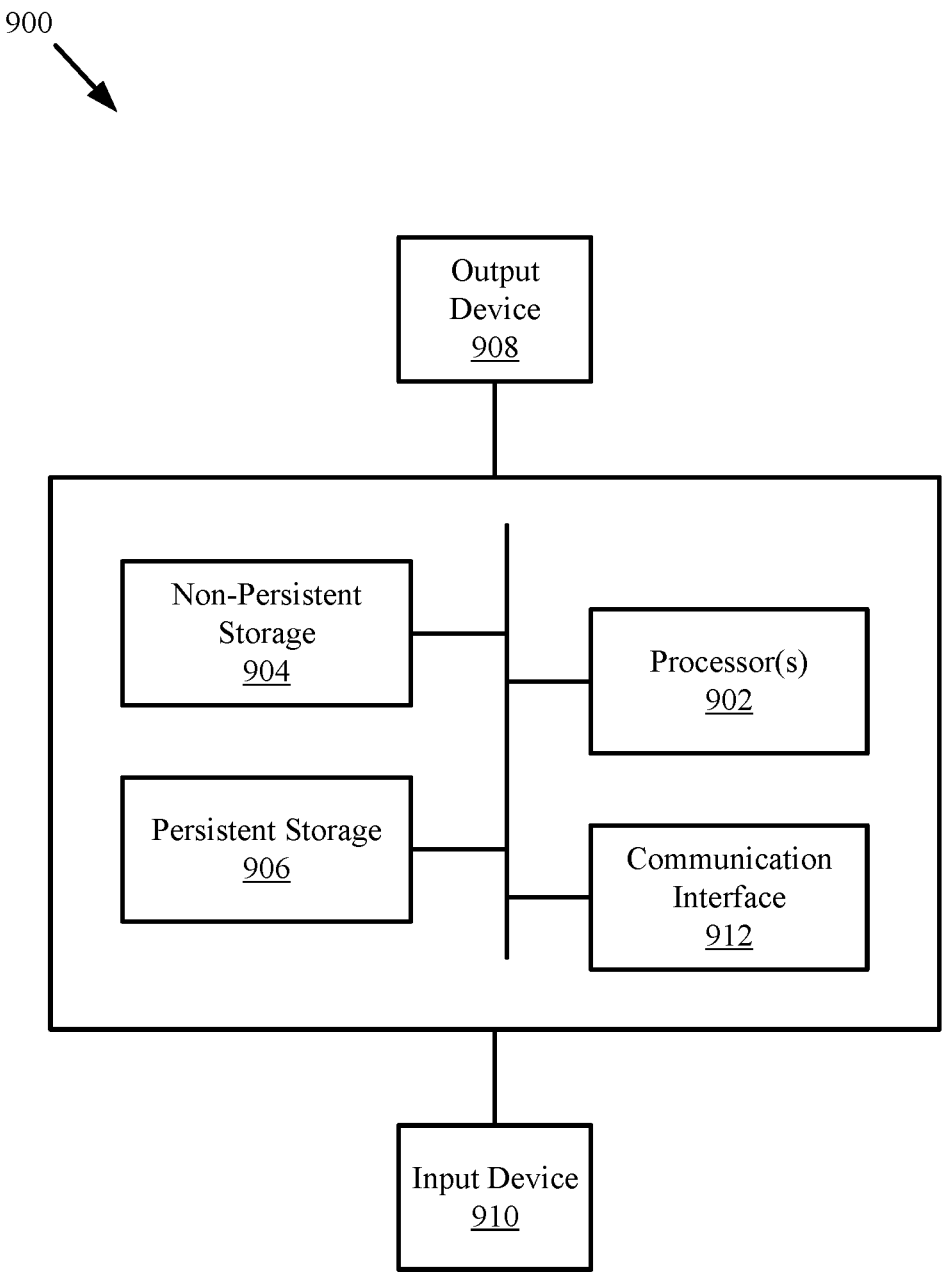
FIG. 9 shows a diagram of a computing device in accordance with one or more embodiments.

In one or more embodiments, the client device(s) (140) may be implemented as a computing device (e.g., 900, FIG. 9). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client device described throughout this application. Alternatively, in one or more embodiments, the client device (s) (140) may also be implemented as a logical device.

Figure 2:
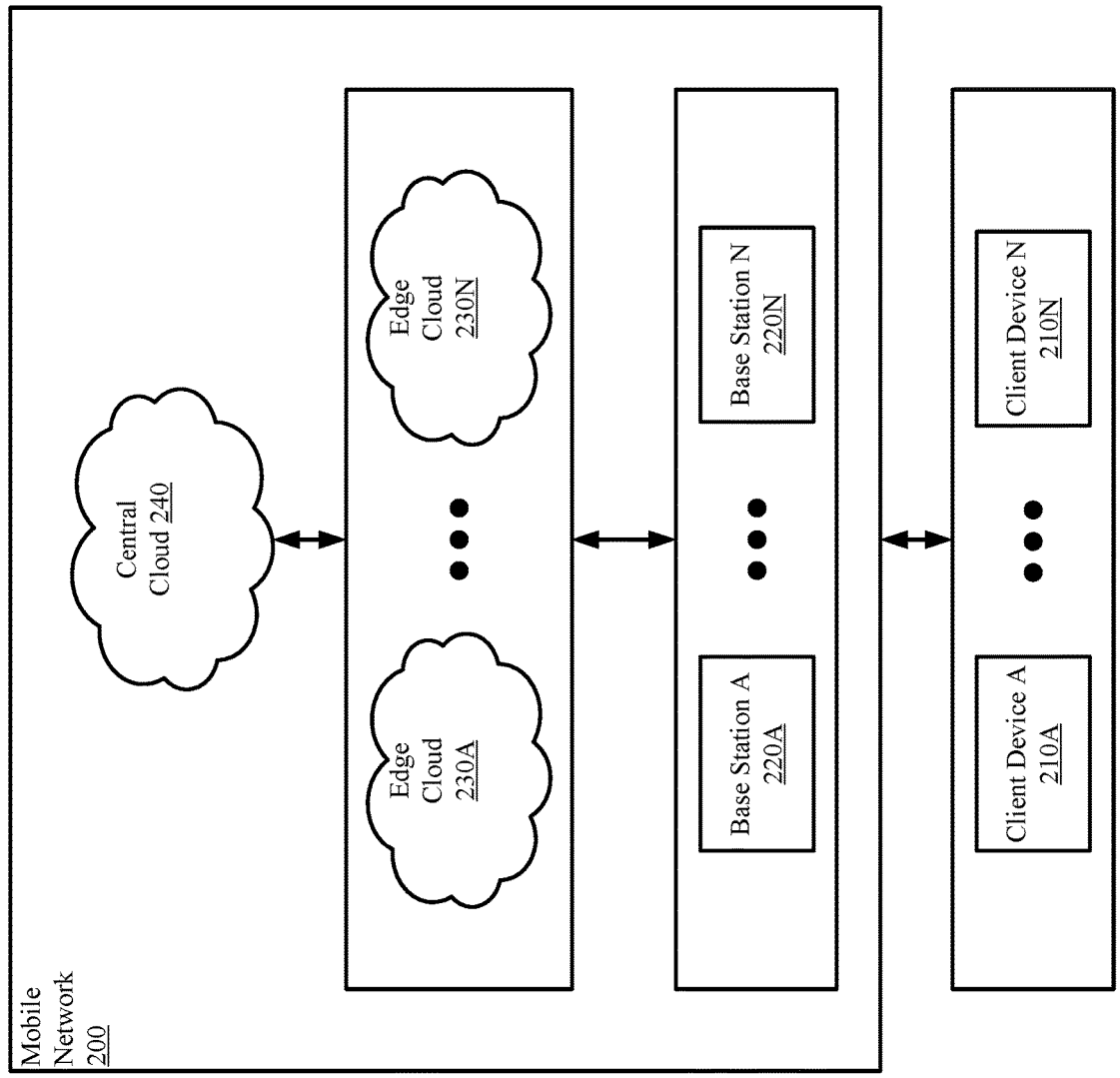
FIG. 2 shows a diagram of a mobile network in accordance with one or more embodiments.

Turning now to FIG. 2, FIG. 2 shows a mobile network (200) operatively connected to a number of client devices (210A, 210N) in accordance with one or more embodiments. The mobile network (200) may coincide with the mobile network (130) illustrated in FIG. 1 and the client devices (210A. 210N) may coincide with the client devices (140) illustrated in FIG. 1. The mobile network (200) is merely illustrative of an example mobile network and the mobile network (200) may include other configurations without departing from the scope of the embodiments disclosed herein.

In one or more embodiments, the mobile network (200) includes any number of base stations (220A, 220N), any number of edge clouds (230A, 230N), and/or a central cloud (240) operatively connected to one another. In this manner, the mobile network (200) is a disaggregated mobile network. Each of these components is described in detail below.

In one or more embodiments, as described above, the client devices (210A, 210N) operatively connect to the mobile network (200) to receive wireless communication services. In doing so, each client device (210A, 210N) may operatively connect to one or more base stations (220A, 220N) to receive the wireless communication services. In doing so, the base stations (220A, 220N) send and receive signals to and from the client devices (210A, 210N) and perform some initial processing of the signals. Each base station (210A, 210N) is operatively connected to one or more edge clouds (230A, 230N) and exchanges data with the edge clouds (230A, 230N) to coordinate the signal transmission between the client devices (210A, 210N) and the base stations (220A, 220N). Each edge cloud (230A, 230N) is generally located in proximity to the base stations (210A, 210N) with which the edge cloud (230A, 230N) is operatively connected. The edge clouds (230A, 230N) are also operatively connected to a central cloud (240) which provides further processing capabilities and coordinates the functionality provided by the mobile network (200).

In one or more embodiments, the base stations (220A, 220N) are part of a RAN that provides radio communications to the client devices (210A, 220N). Further, each base station (220A, 220N) may include any number of components to provide radio communication (e.g., transmission and reception of signals). In one or more embodiments, the base stations (220A, 220N) include an antenna system, a radio unit, a baseband unit, and support systems. In one or more embodiments, the antenna system includes any number of antennas that are configured to transmit and receive signals. In one or more embodiments, the radio unit generates signals to be transmitted by the antenna system and extracts signals received by the antenna system. In one or more embodiments, the radio unit also provides a conversion between digital and analog of signals. In one or more embodiments, the baseband unit processes signals received from the edge clouds (230A, 230N) and/or one or more distributed units and sends the signal to the radio unit as necessary. In one or more embodiments, the baseband unit processes signals received from the radio unit and sends the signal to one or more edge clouds (230A, 230N) and/or one or more distributed units as necessary. In one or more embodiments, the support systems include energy provision (e.g., electrical connections), energy storage (e.g., batteries), physical support (e.g., towers, physical structures, etc.), temperature control (e.g., heating, ventilation, and air conditioning components), power amplifiers (e.g., providing increased power to the electrical signals sent and received by the antenna system), and any other physical components supporting the operation of the base station (220A, 220N).

In one or more embodiments, one or more of the components of the base stations (220A, 220N) may be operable in different energy consumption modes to provide increased or decreased networking resources. In one or more embodiments, a power amplifier adjusts the strength of a signal provided before feeding it to an antenna and may have different energy consumption based on the relative gain it provides. Further, portions of the radio unit and baseband unit may operate at different levels of energy consumption (e.g., energy consumption modes), with different energy consumption levels providing a different level networking performance. As such, each base station may be set to operate at any number of different modes with different energy consumptions modes, with each energy consumption mode providing a different levels of network performance. For example, a first energy consumption mode may include all components operating at maximum capacity, a second energy consumption mode may include turning off power amplification for a first period of time, a third energy consumption mode may include turning off power amplification and some of the radio unit for a second period of time, a fourth energy consumption mode may include turning off power amplification and most or all of the radio unit for a third period of time, a fifth energy consumption mode may include turning off power amplification, most or all of the radio unit, most or all of the baseband unit for a fourth period of time, and a sixth energy consumption mode may include turning off power amplification, most or all of the radio unit, most or all of the baseband unit for a fifth period of time, where each subsequent period of time is longer than the previous one. Further, in one or more embodiments, a networking resource may refer to bandwidth, latency, download speed, upload speed, jitter, packet loss, round trip time, packet delay variation, or any other metric used to determine a network's performance. Further, measurements of the networking resources may be considered key performance indicators (KPIs) for the mobile network.

In one or more embodiments, the edge clouds (230A, 230N) and the central cloud (240) are implemented as physical computing devices and/or logical computing devices. In one or more embodiments, as being a physical computing device or a logical computing device (e.g., a VM), the edge clouds (230A, 230N) and the central cloud (240) may be configured for hosting and maintaining various workloads, and/or for providing a computing environment (e.g., computing power and storage) whereon workloads may be implemented. Further, the edge clouds (230A, 230N) and/or the central cloud (240) may also exchange data with a cloud system and/or data center, which may be maintained by another organization, provides additional resources (e.g., processing resources, storage resources, networking resources, etc.) to the edge clouds (230A, 230N) and/or the central cloud (240), or, more generally, to the operations of the organization. Further, in one or more embodiments, the edge clouds (230A, 230N) and the central cloud (240) are implanted in a single computing layer rather than multiple layers, as illustrated.

In one or more embodiments, the edge clouds (230A, 230N) and/or the central cloud (240) may support various applications to determine the networking resources provided to each of the client devices (210A, 210N), which may be dependent on the user of the client device (210A, 210N). For example, the priority (e.g., the user access level) of a user may be used to determine how to manage networking resources provided to that user. As yet another example, the priority of a user may be used to identify the networking resources provided to that user. As yet another example, the priority of an application on a client device (210A, 210N) may be used to identify the networking resources that need to be provided to that application.

As used herein, "network traffic" is an amount of data moving across a network and/or via specific devices within the network at any given time. For example, any portion, or all of, the data transmitted between client devices (e.g., 210A, 210N) and a mobile network (e.g., mobile network 200) and between the various components of the mobile network may be considered the network traffic for the mobile network.

In one or more embodiments, the edge clouds (230A, 230N) and/or the central cloud (240) may include, for example (but not limited to): a router, a switch, a firewall, a module, infrastructure, a server, an application-delivery controller, a network device, etc. In one or more embodiments, the components (described above) of the edge clouds (230A, 230N) and/or the central cloud (240) provide, at least, (i) network infrastructure (which connects servers (physical and/or virtualized), data center services, storage, and external connectivity to end-user locations (e.g., clients)), (ii) storage infrastructure, and (iii) computing resources (e.g., processing, memory, local storage, network connectivity, etc.) that drive applications.

As used herein, a "policy" is a collection of information, that includes, for example (but not limited to): policies governing the transmission and reception of signals and data over the mobile network in both download and upload direction, and/or a policy may be set to comply with a set of SLAs agreed upon between an end user and/or client and a base station and/or provider of a mobile network.

As used herein, a "rule" is a guideline used by an SLA component to select a particular target device (or target devices), based on the ability of the target device to meet requirements imposed by the SLA. For example, a rule may specify that a base station having a particular performance parameter should be used as the target base station for a client device.

As used herein, an "SLA" between, for example, a base station and/or provider of a mobile network and an end user and/or client may specify one or more user performance requirements such as requirements for networking resources made available for the particular end user and/or client.

As used herein, a "server" may be a physical computing device or a logical computing device (e.g., a VM) and may include functionality to: (i) provide computer-implemented services (e.g., receiving a request, sending a response to the request, etc.) to one or more entities (e.g., users, components of the system (100), etc.) and (ii) exchange data with other components registered in/to the network in order to, for example, participate in a collaborative workload placement.

As used herein, a "cloud" refers to servers that are accessed over the Internet (and the software and databases that executes on those servers). With the help of a cloud (or "cloud computing"), users or organizations do not need to manage physical servers themselves or execute software applications on their own computing devices. In most cases, a cloud enables users to access same files and/or applications from almost any computing device, because the computing and storage take place on servers, instead of locally on users' computing devices. For example, a user may log into the user's email account on a new computing device and still may find the email account in place with all email conversion history.

In one or more embodiments, the edge clouds (230A, 230N), the central cloud (240), and/or the client devices (210A, 210N) may be implemented as a computing device (e.g., 900, FIG. 9). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored in the persistent storage, that when executed by the processor(s) of the computing device cause the computing device to perform the functionality of the data center described throughout this application.

Alternatively, in one or more embodiments, the edge clouds (230A, 230N), the central cloud (240), and/or the client devices (210A, 210N) may be implemented as a logical device. The logical device may utilize the computing resources of any number of computing devices to provide the functionality of the edge clouds (230A, 230N), the central cloud (240), and/or the client devices (210A, 210N) described throughout this application.

As used herein, "storage" refers to a hardware component that is used to store data in a client. Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

As used herein, "memory" may be any hardware component that is used to store data in a client. The data stored may be accessed almost instantly (e.g., in milliseconds) regardless of where the data is stored in memory. The memory may provide the above-mentioned instant data access because the memory may be directly connected to a CPU on a wide and fast bus (e.g., a high-speed internal connection that transfers data among hardware components of a client).

Turning now to FIG. 3.1, FIG. 3.1 shows a diagram of a digital twin (300) in accordance with one or more embodiments. The digital twin (300) may be an example of the digital twin (e.g., 110, FIG. 1) discussed above in reference to FIG. 1. The digital twin (300) may include a traffic predictor (310) and a network behavior emulator (330). The digital twin (300) may include additional, fewer, and/or different components without departing from the scope of the embodiments disclosed herein. Each component may be operably connected to any of the other component via any combination of wired and/or wireless connections. Each component illustrated in FIG. 3.1 is discussed below.

In one or more embodiments, the traffic predictor (310) includes functionality to predict mobile network traffic at differing time scales. In one or more embodiments, the traffic predictor (310) receives real-time network traffic data from the mobile network (e.g., 130, FIG. 1) and generates network traffic predictions based on the data received from the mobile network. In one or more embodiments, the traffic predictor (310) also includes functionality to store in a memory the data received from the mobile network to generate a database of historical data received from the mobile network. In one or more embodiments, the network traffic predictions generated by the traffic predictor (310) also use time and location information (e.g., to generate spatial and/or temporal correlations). Further, in one or more embodiments, the time scales of the network traffic predictions may be at any number of any appropriate time scales, including a sub-frame or frame level of 5G transmission, seconds, minutes, hours, daily, weekly, monthly, or any other time scale. The network traffic predictions may be utilized as described below.

In one or more embodiments, the network behavior emulator (330) includes functionality to emulate the behavior of some or all of the mobile network. In one or more embodiments, the network behavior emulator (330) includes functionality to emulate the topology of the mobile network (e.g., the location of each device, the connectivity of each device, the specific traffic demand of each device, etc.). In one or more embodiments, the network behavior emulator (330) also includes functionality to communicate with the mobile network to update the topology emulated by the digital twin (300) to match the topology of the mobile network. For example, the network behavior emulator (330) may emulate the behavior of specific elements such as base station(s), client device traffic demand, physical channels between client devices and base stations (e.g., using frequency specific analytical models (e.g., randomized through emulations such as Monte-Carlo emulations) or data-driven channel models, and/or power consumption of components within the mobile network (e.g. using analytical or data driven models).

Accordingly, in one or more embodiments, the digital twin (300) is an accurate representation of a physical mobile network that may be capable of predicting network traffic based on real-time network traffic of the mobile network and performing various emulations using the predicted network traffic. The emulation may then be used in accordance with the embodiments disclosed herein to provide enhanced energy efficiency and network policies.

Turning now to FIG. 3.2, FIG. 3.2 shows a diagram of the traffic predictor (310) in accordance with one or more embodiments. The traffic predictor (310) may include a database (312), a short-term traffic predictor (320), and a long-term traffic predictor (322) that includes a spatial correlator (314), a time correlator (316), and a learning module (318). The traffic predictor (310) may include additional, fewer, and/or different components without departing from the scope of the embodiments disclosed herein. Each component may be operably connected to any of the other component via any combination of wired and/or wireless connections. Each component illustrated in FIG. 3.2 is discussed below. In one or more embodiments, the traffic predictor (310) receives data in real-time or near real-time from the mobile network (e.g., 130, FIG. 1) to provide the functionality described below.

In one or more embodiments, the database (312) stores all data utilized by the traffic predictor (310), including network traffic data, base station data, device connectivity information, mobile network topology information received from the mobile network, traffic demands, for example, at the medium access control (MAC) layer, client device traffic classes, handover probabilities for traffic steering, etc. In one or more embodiments, the database (312) also stores some or all of the previous outputs of the traffic predictor (310).

In one or more embodiments, the long-term traffic predictor (322) provides network traffic predictions at a time-scale greater than the time-scale of the predictions provided by the short-term traffic predictor (320) (provided below). In one or more embodiments, the predictions provided by the long-term traffic predictor (322) are based on any combination of the data provided and or computed by the spatial correlator (314), the time correlator (316) and the learning module (318).

In one or more embodiments, the learning module (318) may include any number of machine learning and/or artificial intelligence modules. For example, the learning module (318) may include any number of supervised learning models, unsupervised learning models, reinforcement learning models, or any other model. For example, the learning module (318) may provide machine learning and/or artificial intelligence based outputs for the short-term traffic predictor (320) and/or the long-term traffic predictor (322) as provided for below. Further, the learning module (318) learns network traffic patterns based on its inputs and provides forward-looking predictions at different time-scales (described below) of network traffic.

In one or more embodiments, the spatial correlator (314) provides functionality to predict a spatial component of network traffic (e.g., a spatial correlation). In one or more embodiments, the spatial correlator (314) provides a prediction of which location is going to have network traffic and the amount of network traffic, which may be any number of client devices, bandwidth requested, etc. In one or more embodiments, the spatial correlator (314) provides a prediction of which base station, or which specific component of a base station (for example when multiple radios are connected through remote radio heads (RRH), is going to have network traffic and the amount of network traffic. In one or more embodiments, the spatial correlator (314) operates in conjunction with the database (312) and/or the learning module (318). For example, the spatial correlator (314) may utilize historical network traffic data and/or real-time network traffic data as inputs into the learning module (318) to generate a spatial correlation. In one or more embodiments, the spatial correlator (314) utilizes, via the learning module (318) any artificial intelligence and/or machine learning technique that is operable in two or more dimensions, including graphical convolutional networks and three dimensional long-short term memory. In one or more embodiments, the spatial correlator (314) utilizes any number of graphical convolutional networks in parallel to generate a spatial correlation. In one or more embodiments, the spatial correlator (314) is updated from time-to-time using feedback from its outputs, real network traffic data, outputs from other digital twins, etc.

In one or more embodiments, the time correlator (316) provides functionality to predict a time component of network traffic (e.g., a time correlation). In one or more embodiments, the time correlator (316) provides the auto-correlation factor of the traffic demand. In one or more embodiments, the output of the time correlator (316) is used to provide a time prediction based on a particular location, including a particular base station, or even a specific component of a base station. In one or more embodiments, the time correlator (316) operates in conjunction with the database (312), the spatial correlator (314), and/or the learning module (318). For example, the time correlator (316) may utilize historical network traffic data, real-time network traffic data, and/or spatial correlations as inputs into the learning module (318) to generate a time correlation. In one or more embodiments, the time correlator (316) utilizes, via the learning module (318), any artificial intelligence and/or machine learning technique that is operable in one or more dimensions, including long-short term memory. In one or more embodiments, the time correlator (316) utilizes any number of long-short term memory models in parallel to generate a time correlation. In one or more embodiments, the time correlator (316) is updated from time-to-time using feedback from its outputs, real network traffic data, outputs from other digital twins, etc.

In one or more embodiments, the combination of the spatial correlation and time correlation provides a complete network traffic prediction at the time scales provided by the time correlator (316). In one or more embodiments, the time correlator (316) may provide multiple outputs at different time scales, which may include time scales in minutes, hours, daily, weekly, monthly, and/or any time scale between one minute and monthly. As such, the network traffic prediction provided by the space correlator (314) and the time correlator (316) may be considered a long-term traffic predictor. In one or more embodiments, the complete network traffic prediction provides any combination of where the network traffic will occur, the amount of network traffic, which mobile network components will handle the network traffic, and the networking resources consumed by the network traffic.

In one or more embodiments, the short-term traffic predictor (320) provides network traffic predictions at time scales less than the network traffic prediction provided by the long-term traffic predictor (322). In one or more embodiments, the time scales of the network traffic predictions provided by the short-term traffic predictor are less than a minute, at a millisecond scale, sub millisecond scale, at a frame level or sub-frame level of a component of the mobile network, or any other time scale. In one or more embodiments, the short-term traffic predictor (320) operates in conjunction with the database (312) and/or the learning module (318) to generate its network traffic predictions. In one or more embodiments, the short-term traffic predictor (320) predicts network traffic on a component basis (e.g., providing network traffic predictions for a specific radio unit, etc.). In one or more embodiments, the short-term traffic predictor (320) utilizes network traffic data and base station data (e.g., signal statistics of the downlink transmitted data, frequency bands utilized by any portion or all of a base station, capable of averaging measurements over parallel radio-frequency chains feeding antenna ports of a multiple-in-multiple-out-enabled base station, data from on-board power meters capable of providing measurements for each radio-frequency chain over multiple, parallel radio-frequency chains feeding antenna ports of a multiple-in-multiple-out-enabled base station, or any other radio-frequency data relating to a base station) as inputs to generate network traffic predictions.

In one or more embodiments, the combination of network traffic predictions at different time scales enables the traffic predictor (310) to provide recommendations for energy consumption modes at the different time scales (e.g., from sub-microseconds to months long) and to adapt a network traffic prediction model in a dynamic manner by using real-time network traffic data and historical network traffic data to update the spatial correlator (314) and the time correlator (316).

Turning now to FIG. 3.3, FIG. 3.3 shows a diagram of the network behavior emulator (330) in accordance with one or more embodiments. In one or more embodiments, the network behavior emulator (330) generates predictions of how a mobile network would react (e.g., measurements of KPIs) given certain inputs (e.g., energy consumption modes, network traffic predictions, change in components used in the network, etc.). The network behavior emulator (330) may include a database (332), a network topology generator (334), a traffic module (336), and a base station prediction module (338). The network behavior emulator (330) may include additional, fewer, and/or different components without departing from the scope of the embodiments disclosed herein. Each component may be operably connected to any of the other component via any combination of wired and/or wireless connections. Each component illustrated in FIG. 3.3 is discussed below.

In one or more embodiments, the database (332) stores all data utilized by the network behavior emulator (330), including network traffic data, base station data, mobile network device information, device connectivity information, mobile network topology information received from the mobile network, traffic demands at the medium access control layer, client device traffic classes, handover probabilities for traffic steering, outputs from the traffic predictor (310), etc., In one or more embodiments, the database (332) also stores some or all of the previous outputs of the network behavior emulator (330).

In one or more embodiments, the network topology generator (334) provides functionality to generate an emulated topology based on the actual topology of the mobile network. The topology includes the location of each device in the mobile network (either relative to one another or based on a physical location), the connectivity (physical, electrical, and/or data) of each device to other devices in the mobile network, the specific model and specifications of each device. The network topology generator (334) may also communicate with the mobile network to update the emulated topology based on changes made to the actual topology. For example, if a device is disconnected from the mobile network and/or new devices are connected to the mobile network, the mobile network sends updates to the digital twin and the network topology generator (334) updates the emulated topology accordingly to match the actual network topology. As such, the network topology generator (334) keeps the emulated topology up-to-date thereby improving the accuracy of any outputs generated by the digital twin.

In one or more embodiments, the traffic module (336) receives the predicted network traffic from traffic predictor (310) and applies the predicted network traffic to the emulated network topology. The predicted network traffic includes spatial and temporal elements, and the traffic module (336) may apply this traffic to the emulated topology and determine which devices handle which portion of the traffic, thereby emulating a connectivity graph of the emulated topology. In one or more embodiments, the traffic module (336) applies the predicted network traffic to each base station in the emulated topology to generate an emulated network traffic for each base station.

In one or more embodiments, the base station prediction module (338) provides functionality to emulate the behavior of each base station in the emulated topology and based on the predicted network traffic. In one or more embodiments, the base station prediction module (338) generates emulated base station data (e.g., power consumption of any portion or all of a base station, frequency bands utilized by any portion or all of a base station, data from on-board power meters capable of averaging measurements over parallel radio-frequency chains feeding antenna ports of a multiple-in-multiple-out-enabled base station, data from on-board power meters capable of providing measurements for each radio-frequency chain over multiple, parallel radio-frequency chains feeding antenna ports of a multiple-in-multiple-out-enabled base station, or any other radio-frequency data relating to a base station). Further, the base station prediction module (338) may also be based on a selected energy consumption mode for each base station and provide predictions of networking resources.

In one or more embodiments, the digital twin may be updated from time-to-time to conform to real world changes to the mobile network. For example, changes in the mobile network topology (e.g., a base station becoming unavailable) or other unexpected changes may cause spikes or other changes in actual network traffic that deviates from the predicted network traffic. To correct for this deficiency, the digital twin may be updated according to a schedule and/or continuously updated.

Figure 4:
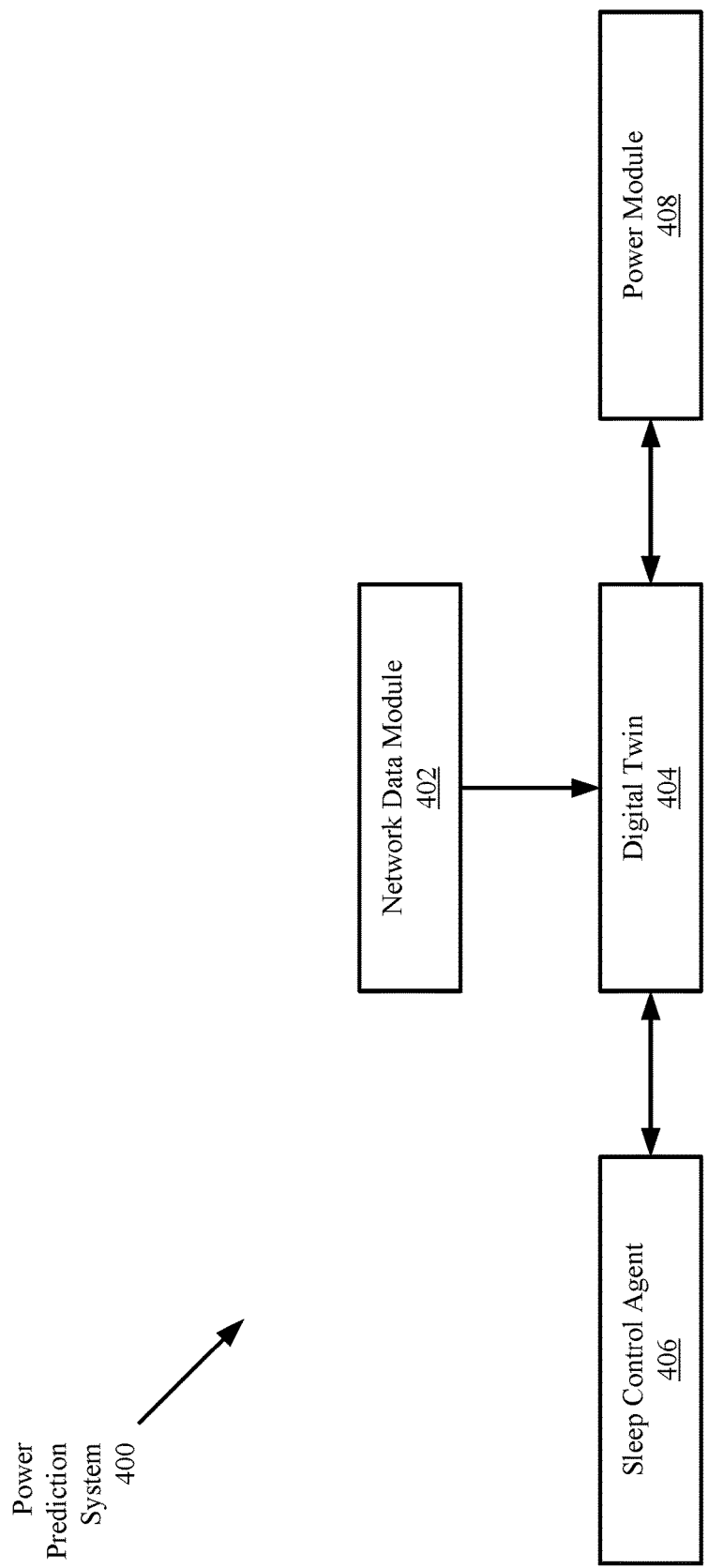
FIG. 4 shows a power prediction system in accordance with one or more embodiments.

Turning now to FIG. 4, FIG. 4 shows a diagram of power prediction system (400) in accordance with one or more embodiments. In one or more embodiments, the power prediction system (400) generates predictions of how a mobile network's power consumption would change based on changes to operational modes of components (that lead to different energy consumption levels) within the mobile network. The power prediction system (400) may include a network data module (402), a digital twin (404), a sleep control agent (406), and a power module (408). The power prediction system (400) may include additional, fewer, and/or different components without departing from the scope of the embodiments disclosed herein. Each component may be operably connected to any other component via any combination of wired and/or wireless connections. Each component illustrated in FIG. 4 is discussed below.

In one or more embodiments, the network data module (402) is an example of a module (e.g., 160, FIG. 1) and/or the digital twin API (e.g., 120, FIG. 1). In one or more embodiments, the network data module (402) is operable to provide network traffic data to the digital twin (404) from the mobile network. The network data module (402) may provide the network traffic data in real-time or at a chosen granularity. To achieve the chosen granularity, the network data module (402) may capture network traffic data over a set period of time and provide the network traffic data to the digital twin (404) for that set period of time. Further, the network data module (402) may average the network traffic data collected over the set period of time to reduce the computational load of the digital twin (404). In one or more embodiments, the set period of time may include any period of time, including sub microseconds, microseconds, seconds, minutes, hours, days, or longer.

In one or more embodiments, the digital twin (404) is an example of the digital twin (e.g., 300, FIG. 3.1) discussed above. As such, the digital twin (404) is operable to provide predictions of how the mobile network may react given certain inputs.

In one or more embodiments, the power module (408) is an example of a module (e.g., 160, FIG. 1) discussed above. In one or more embodiments, the power module (408) provides a model for energy consumption and energy consumption modes for any portion, including all, of the components of a given base station. Further, the power module (408) may communicate with the digital twin (404) to receive the data necessary to provide the energy consumption estimate for a given component based on the energy consumption mode selected for the component and the emulation of the mobile network provided by the digital twin. The power module (408) may then send the energy consumption estimate and energy consumption mode of each component to the digital twin (404). Further, in one or more embodiments, the power module (408) may utilize any modelling scheme to provide the energy consumption prediction. In one or more embodiments, the energy consumption modes available within the power module (408) are entered by a user, generated using a lookup table, retrieved from a database, etc.

In one or more embodiments, the sleep control agent (406) is an example of an agent (e.g., 150, FIG. 1) discussed above. In one or more embodiments, the sleep control agent (406) provides predictions of appropriate energy consumption modes for components in the emulated mobile network to the digital twin (404) as per the predicted traffic. For example, the sleep control agent (406) may receive an output from the digital twin (404) and analyze the energy consumption of the current operational energy consumption mode (e.g., an energy consumption mode setting for one or more components in the digital twin and/or a schedule of energy consumption mode settings for one or more components in the digital twin) of the components emulated in the digital twin (404) and output an updated energy consumption mode and send the updated energy consumption mode to the digital twin (404). Thereafter, the digital twin (404) may perform another emulation using the same network traffic prediction to determine the effects of the updated energy consumption mode on a global network energy consumption metric. In one or more embodiments, to provide this functionality, the sleep control agent (406) may include any artificial intelligence and/or machine learning technique, including reinforcement learning techniques, unsupervised learning techniques, supervised learning techniques, etc. In addition, the sleep control agent (406) may be trained using historical network traffic data.

In one or more embodiments, the power prediction system (400) provides functionality to: perform "what-if" scenario evaluations based on the actual mobile network topology and based on real-world network traffic data; identify the impact of all available changes to the operability of components within the mobile network, such as varying a power amplifier bias to alter power consumption on a dynamic basis during regular network traffic activity; determine potential energy consumption mode schemes and the effects of the potential energy consumption mode schemes; determine the effects of energy consumption mode schemes over time (at the time scales described above) on the KPIs of the mobile network; and determine optimization frameworks for the mobile network.

Figure 5:
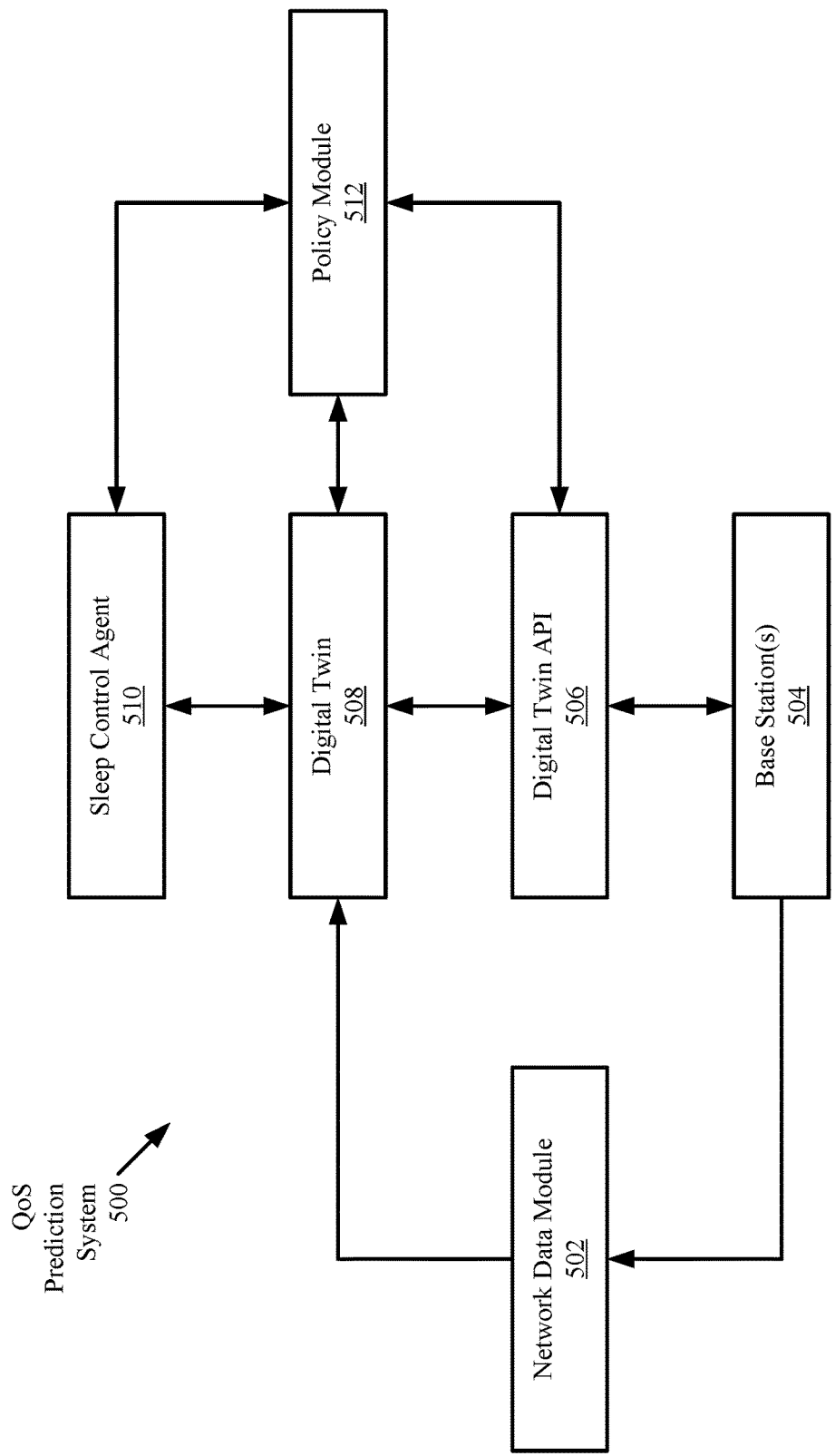
FIG. 5 shows a quality of service prediction system in accordance with one or more embodiments.

Turning now to FIG. 5, FIG. 5 shows a diagram of a quality of service (QOS) prediction system (500) in accordance with one or more embodiments. In one or more embodiments, the QoS prediction system (500) generates predictions of how a QoS of a mobile network would react (e.g., measurements of KPIs) based on changes to energy consumption modes of components within the mobile network. The QoS prediction system (500) may include a network data module (502), any number of base stations (504), a digital twin API (506), a digital twin (508), a sleep control agent (510), and a policy module (512). The QoS prediction system (500) may include additional, fewer, and/or different components without departing from the scope of the embodiments disclosed herein. Each component may be operably connected to any of the other component via any combination of wired and/or wireless connections. Each component illustrated in FIG. 5 is discussed below.

In one or more embodiments, the network data module (502) is an example of a module (e.g., 160, FIG. 1) and/or the digital twin API (e.g., 120, FIG. 1). In one or more embodiments, the network data module (502) is operable to provide network traffic data to the digital twin (508) from the base stations (504). The network data module (502) may provide the network traffic data in real-time and/or at a chosen granularity. To achieve the chosen granularity, the network data module (502) may capture network traffic data over a set period of time and provide the network traffic data to the digital twin (508) for that set period of time. Further, the network data module (502) may average the network traffic data collected over the set period of time to reduce the computational load of the digital twin (508). In one or more embodiments, the set period of time may include any period of time, including sub microseconds, microseconds, seconds, minutes, hours, days, or longer. In one or more embodiments, the network data module (502) provides functionality to select which data to gather from the base stations (504) and/or which data to provide to the digital twin (508).

In one or more embodiments, the base stations (504) are an example of the base stations (e.g., 220A, 200N, FIG. 2) described above. In one or more embodiments, the digital twin API (506) is an example of the digital twin API (e.g., 120, FIG. 1) described above. In one or more embodiments, the digital twin (508) is an example of the digital twin (e.g., 300, FIG. 3) described above. In one or more embodiments, the sleep control agent (510) is an example of the sleep control agent (e.g., 406, FIG. 4) described above.

In one or more embodiments, the policy module (512) is an example of one of the modules (e.g., 160, FIG. 1) described above. In one or more embodiments, the policy module (512) provides functionality to construct reward mapping for the sleep control agent (510) and ensures that any potential energy consumption mode schemes comply with policies of the operator of the mobile network. For example, the policy module (512) determines a penalty to the KPIs based on the energy consumption mode scheme provided by the sleep control agent (510) to the digital twin (508). Further, the policy module (512) may maintain a database of policies (e.g., KPIs that should be maintained across some or all of the network) and check to ensure that any energy consumption mode scheme emulated on the digital twin (508) complies with the policies maintained by the mobile network operator. In one or more embodiments, the policy module (512) may provide or allow to be provided (e.g., via yet another next generation messages that are conformant with network configuration protocols) an energy consumption mode scheme emulated by the digital twin (508) to the base stations (504) after which the base stations (504) may employ the energy consumption mode scheme generated by the sleep control agent (510) and/or the digital twin (508).

Figure 6:
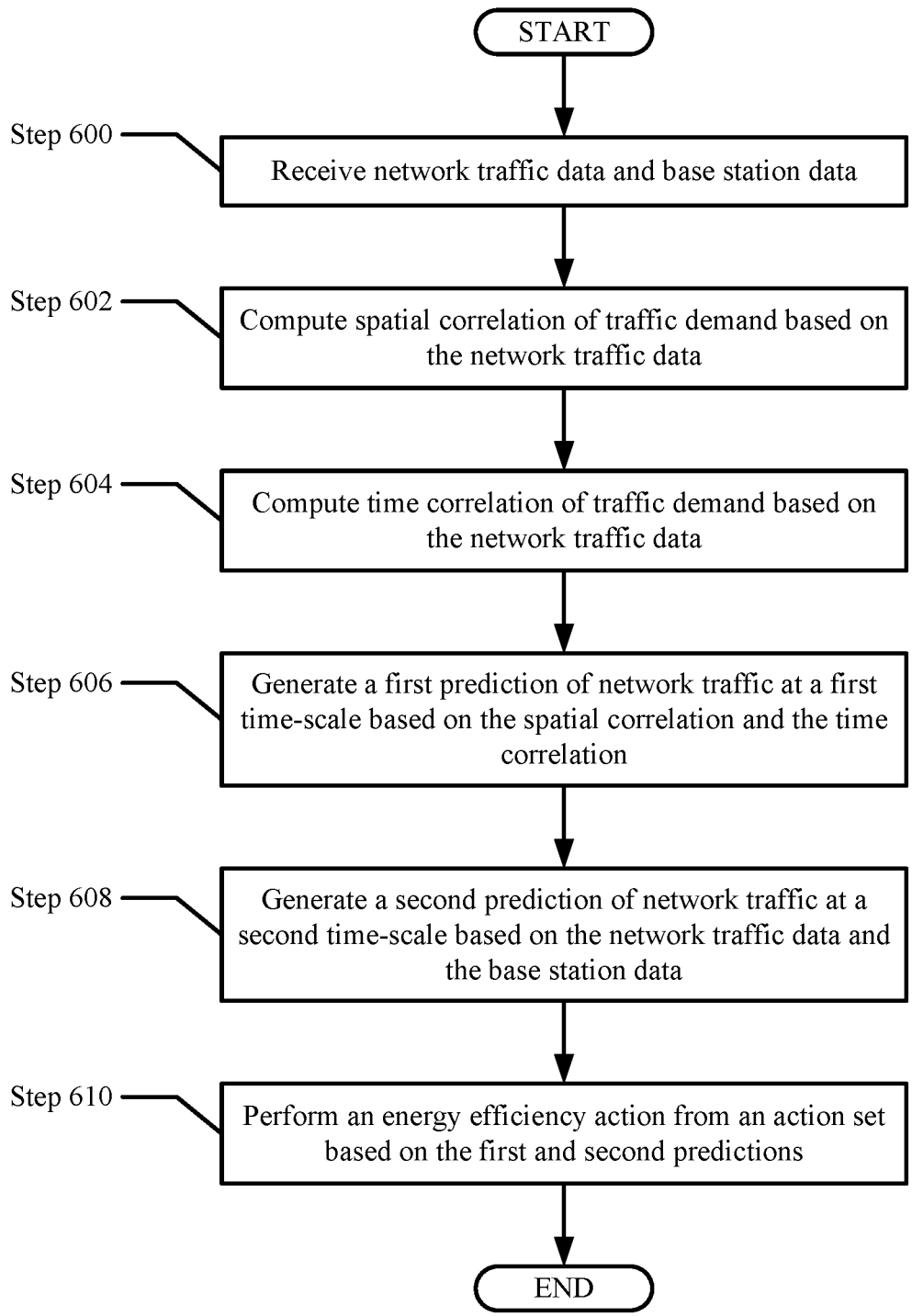
FIG. 6 shows a method in accordance with one or more embodiments.

FIG. 6 shows a method generally for performing energy efficiency enhancement actions for a mobile network using a digital twin. For example, a digital twin may receive real-time data from the mobile network and provide certain emulation actions in conjunction with additional agents and/or modules to predict the behavior of the mobile network under certain conditions, which may be potential changes to the operation of the mobile network. Then, based on the predictions provided by the digital twin, different actions may be performed that enhance the energy efficiency of the mobile network, thereby increasing the energy efficiency of the mobile network and reducing the carbon footprint of the mobile network.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein. The method described below may enable increased energy efficiency of a mobile network using a digital twin.

Turning now to FIG. 6, the method shown in FIG. 6 may be executed by, for example, the above-discussed digital twin (e.g., 110, FIG. 1). Other components (e.g., agents (150) and/or modules (160)) of the system (100) illustrated in FIG. 1 may also execute all or part of the method shown in FIG. 6 without departing from the scope of the invention.

In Step 600, the digital twin receives network traffic data and base station data. In one or more embodiments, the digital twin receives the network traffic data and base station data through a digital twin API (e.g., 120, FIG. 1) and/or from a network data module (e.g., 402, FIG. 4). In one or more embodiments, the network traffic data includes any data relating to network traffic and/or networking resources within the mobile network. In one or more embodiments, the base station data includes power consumption of any portion or all of a base station, frequency bands utilized by any portion or all of a base station, capable of averaging measurements over parallel radio-frequency chains feeding antenna ports of a multiple-in-multiple-out-enabled base station, data from on-board power meters capable of providing measurements for each radio-frequency chain over multiple, parallel radio-frequency chains feeding antenna ports of a multiple-in-multiple-out-enabled base station, energy consumption mode schemes, or any other radio-frequency data relating to a base station.

In Step 602, the digital twin computes a spatial correlation of traffic demand based on the network traffic data. In one or more embodiments, the spatial correlation provides a prediction of which location is going to have network traffic and the amount of network traffic (e.g., density of network traffic on a geographic basis), which may be any number of client devices, bandwidth requested, etc. In one or more embodiments, the spatial correlation provides a prediction of which base station, or which specific component of a base station and the amount of network traffic. In one or more embodiments, the spatial correlation is based on historical network traffic data, real-time network traffic data, and/or a time correlation as inputs. In one or more embodiments, the spatial correlation is used in any artificial intelligence and/or machine learning technique that is operable in two or more dimensions, including graphical convolutional networks and three dimensional long-short term memory. In one or more embodiments, the spatial correlation is utilized by any number of graphical convolutional networks in parallel.

In Step 604, the digital twin computes a time correlation of traffic demand based on the network traffic data. In one or more embodiments, the time correlation is used in prediction of the amount of network traffic that will occur. In one or more embodiments, the time correlation helps in determining a time prediction based on a particular location, including a particular base station, or even a specific component of a base station. In one or more embodiments, the time correlation is based on historical network traffic data, real-time network traffic data, as inputs. In one or more embodiments, the time correlation is used in any artificial intelligence and/or machine learning technique that is operable in one or more dimensions, including graphical convolutional networks and long-short term memory. In one or more embodiments, the time correlation is utilized in any number of long-short term memory models in parallel to generate a time correlation.

In Step 606, the digital twin generates a first prediction of network traffic at a first time-scale based on the spatial correlation and/or the time correlation. In one or more embodiments, the combination of the spatial correlation and time correlation provides a complete network traffic prediction at the time scales provided by the time correlation. In one or more embodiments, the time correlation may provide multiple outputs at different time scales, which may include time scales in minutes, hours, daily, weekly, monthly, and/or any time scale between one minute and monthly. As such, the first prediction may be considered a long-term traffic prediction. In one or more embodiments, the first prediction provides any combination of where and when the network traffic will occur, the amount of network traffic, which mobile network components will handle the network traffic, and the networking resources consumed by the network traffic.

In Step 608, the digital twin generates a second prediction of network traffic at a second time-scale based on the network traffic data and the base station data. In one or more embodiments, the second time-scale is less than the first time-scale and the second time-scale is considered a short-term time-scale. In one or more embodiments, the time-scales of the second prediction are less than a minute, at a millisecond scale, sub millisecond scale, at a frame level or sub-frame level of a component of the mobile network, or any other time-scale. In one or more embodiments, the second prediction predicts network traffic on a component basis (e.g., providing network traffic predictions for a specific antenna, radio unit, etc.).

In Step 610, the digital twin performs or causes to perform an energy efficiency enhancement action from an action set and based on the first and second predictions. In one or more embodiments, the actuation of the energy efficiency enhancement action set includes: sending a signal to set the base station to a different energy consumption mode; generating an energy consumption mode scheme for the base station; and generating an impact prediction based on a mobile network change event. In one or more embodiments, the energy consumption modes are provided at the different time scales (e.g., from sub-microseconds to months long).

The method may end following Step 610.

Figure 7:
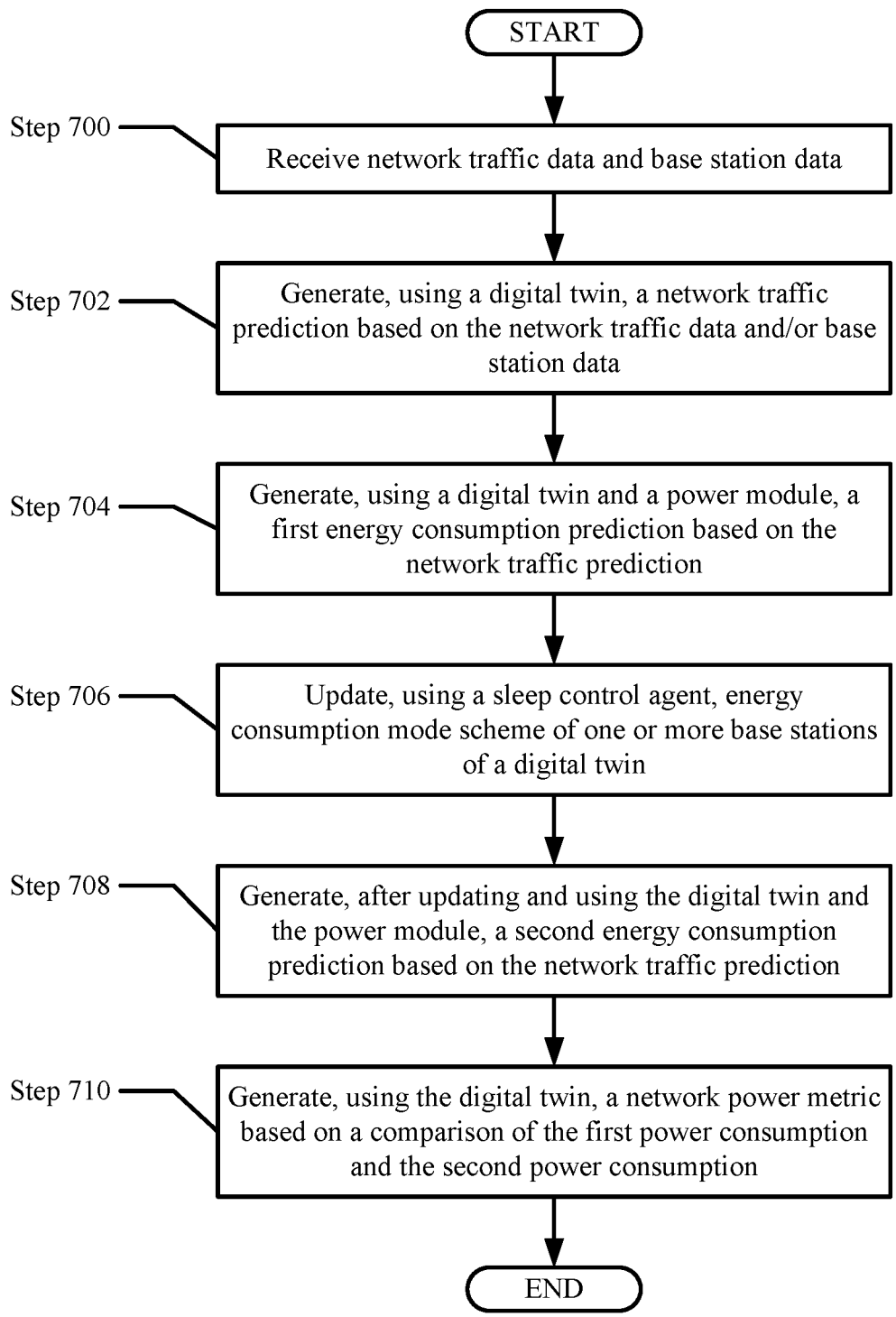
FIG. 7 shows a method in accordance with one or more embodiments.

FIG. 7 shows a method generally for generating a network power metric for a mobile network using a digital twin. For example, a digital twin may receive real-time data from the mobile network and provide certain emulation actions in conjunction with additional agents and/or modules to predict the behavior of the mobile network under certain conditions, which may be potential changes to the operation of the mobile network. Then, based on the predictions provided by the digital twin, different actions may be performed that enhance the energy efficiency of the mobile network, thereby increasing the energy efficiency of the mobile network and reducing the carbon footprint of the mobile network.

In one or more embodiments, the method in FIG. 7 provides functionality to: perform "what-if" scenario evaluations based on the actual mobile network topology and based on real-world network traffic data; identify the impact of all available changes to the operability of components within the mobile network, such as varying a power amplifier bias to alter power consumption on a dynamic basis during regular network traffic activity; determine potential energy consumption modes and the effects of the potential energy consumption modes; determine the effects of energy consumption modes over time (at the time scales described above) on the KPIs of the mobile network; and determine optimization frameworks for the mobile network.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein. The method described below may enable increased energy efficiency of a mobile network using a digital twin.

Turning now to FIG. 7, the method shown in FIG. 7 may be executed by, for example, the above-discussed digital twin (e.g., 404, FIG. 4), sleep control agent (e.g., 406, FIG. 4), and/or the power module (e.g., 408, FIG. 4). Other components (e.g., agents (150) and/or modules (160)) of the system (100) illustrated in FIG. 1 may also execute all or part of the method shown in FIG. 7 without departing from the scope of the invention.

In Step 700, the digital twin receives network traffic data and base station data. In one or more embodiments, the digital twin receives the network traffic data and base station data from a digital twin API (e.g., 120, FIG. 1) and/or a network data module (e.g., 402, FIG. 4). In one or more embodiments, the network traffic data includes any data relating to network traffic and/or networking resources within the mobile network. In one or more embodiments, the base station data includes power consumption of any portion or all of a base station, frequency bands utilized by any portion or all of a base station, data from power meters capable of averaging measurements over parallel radio-frequency chains feeding antenna ports of a multiple-in-multiple-out-enabled base station, data from on-board power meters capable of providing measurements for each radio-frequency chain over multiple, parallel radio-frequency chains feeding antenna ports of a multiple-in-multiple-out-enabled base station, energy consumption mode schemes, or any other radio-frequency data relating to a base station.

In Step 702, the digital twin generates a network traffic prediction based on the network traffic data and/or base station data. The network traffic prediction may include the predictions generated in Step 606 and/or Step 608.

In Step 704, the digital twin, in conjunction with the power module, generates a first energy consumption prediction based on the network traffic prediction. In one or more embodiments, the first energy consumption prediction is also based on a currently-implemented energy consumption mode scheme used by the mobile network. In one or more embodiments, the power module provides a model for energy consumption and energy consumption modes for any portion, including all, of the components of a given base station. Further, the power module may communicate with the digital twin to receive the network traffic prediction and/or emulation based on the network traffic prediction to provide the energy consumption prediction for a given component based on the energy consumption mode selected for the component and the emulation of the mobile network provided by the digital twin. The power module may then send the energy consumption prediction and energy consumption mode of each component to the digital twin. Further, in one or more embodiments, the power module may utilize any modelling scheme to provide the energy consumption prediction. In one or more embodiments, the energy consumption modes available within the power module are entered by a user, generated using a lookup table, retrieved from a database, etc.

In Step 706, the sleep control agent updates the energy consumption mode scheme of one or more base stations of the digital twin to generate an updated energy consumption mode scheme. In one or more embodiments, the sleep control agent may receive an output from the digital twin and analyze the energy consumption of the current operational energy consumption mode (e.g., an energy consumption mode setting for one or more components in the digital twin and/or a schedule of energy consumption mode settings for one or more components in the digital twin) of the components emulated in the digital twin and output an updated energy consumption mode and send the updated energy consumption mode scheme to the digital twin.

In Step 708, the digital twin, in conjunction with the power module, generates a second energy consumption prediction based on the network traffic prediction and the updated energy consumption mode generated in Step 706. In one or more embodiments, the power module provides a model for energy consumption based on current energy consumption modes for any portion, including all, of the components of a given base station. Further, the power module may communicate with the digital twin to receive the network traffic prediction, the updated energy consumption mode scheme, and/or emulation based on the network traffic prediction to provide the energy consumption prediction for a given component based on the updated energy consumption mode scheme. The power module may then send the second energy consumption prediction to the digital twin.

In Step 710, the digital twin generates a network power metric based on a comparison of the first power consumption and the second power consumption. In one or more embodiments, the network power metric provides an indication as to whether the updated energy consumption mode improved the energy efficiency of the mobile network. For example, causing certain base stations to not operate a full capacity may cause other base stations to experience more load which may cause the overall energy efficiency of the mobile network to decrease. In one or more embodiments, the digital twin may also perform an energy efficiency enhancement action from an action set (e.g., Step 610) based on the network power metric.

The method may end following Step 710.

Figure 8:
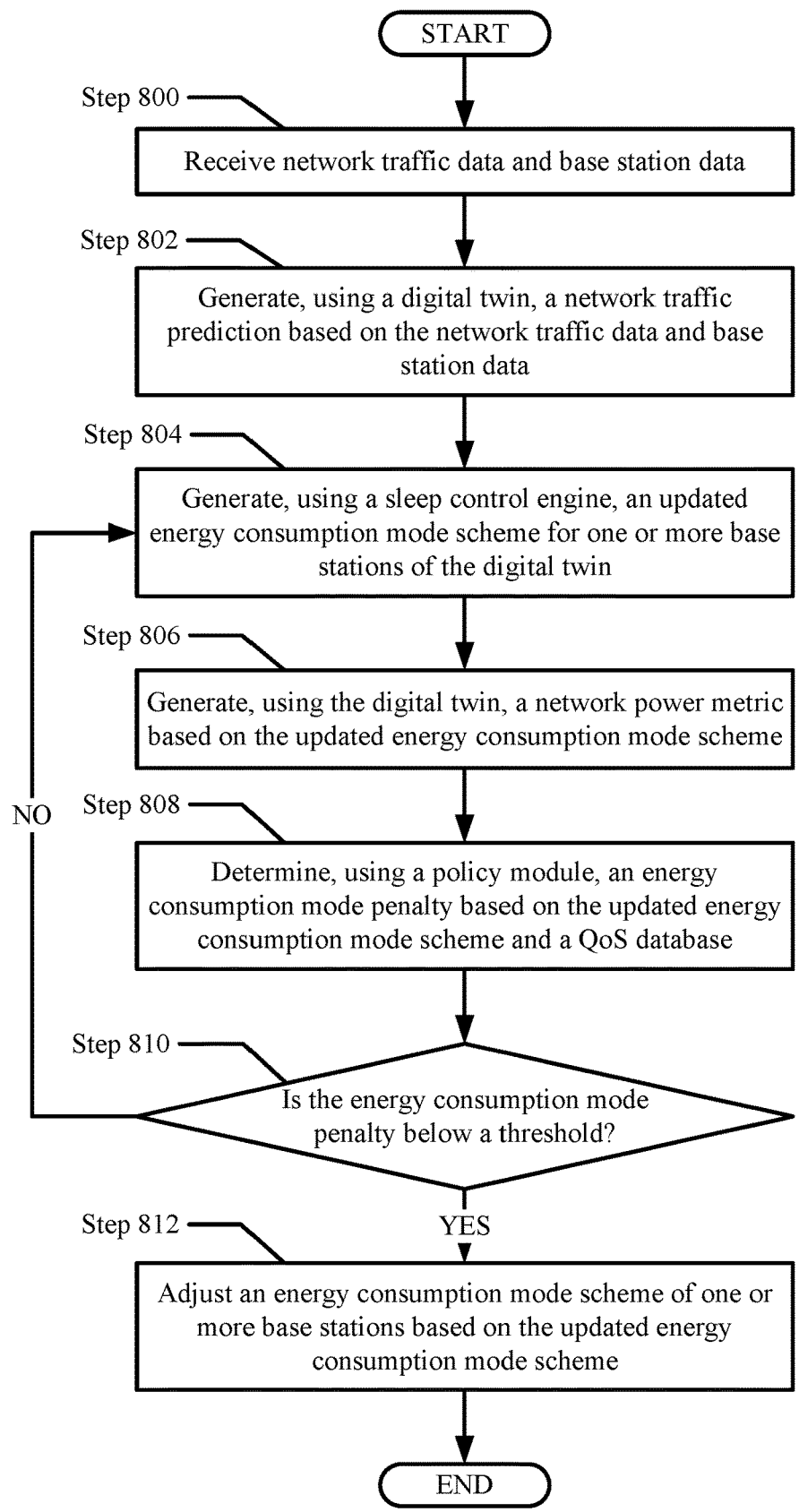
FIG. 8 shows a method in accordance with one or more embodiments.

FIG. 8 shows a method generally for adjusting an energy consumption mode scheme for a mobile network using a digital twin. For example, a digital twin may receive real-time data from the mobile network and provide certain emulation actions in conjunction with additional agents and/or modules to predict the behavior of the mobile network under certain conditions, which may be potential changes to the operation of the mobile network. Then, based on the predictions provided by the digital twin, different actions may be performed that enhance the energy efficiency of the mobile network, thereby increasing the energy efficiency of the mobile network and reducing the carbon footprint of the mobile network.

In one or more embodiments, the method in FIG. 8 provides functionality to: perform "what-if" scenario evaluations based on the actual mobile network topology and based on real-world network traffic data; identify the impact of all available changes to the operability of components within the mobile network, such as varying a power amplifier bias to alter power consumption on a dynamic basis during regular network traffic activity; determine potential energy consumption mode schemes and the effects of the potential energy consumption mode schemes; determine the effects of energy consumption mode schemes over time (at the time scales described above) on the KPIs of the mobile network; and determine optimization frameworks for the mobile network.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein. The method described below may enable increased energy efficiency of a mobile network using a digital twin.

Turning now to FIG. 8, the method shown in FIG. 8 may be executed by, for example, the above-discussed digital twin (e.g., 508, FIG. 5), sleep control agent (e.g., 510, FIG. 5), and/or the policy module (e.g., 512, FIG. 5). Other components (e.g., agents (150) and/or modules (160)) of the system (100) illustrated in FIG. 1 may also execute all or part of the method shown in FIG. 8 without departing from the scope of the invention.

In Step 800, the digital twin receives network traffic data and base station data. In one or more embodiments, the digital twin receives the network traffic data and base station data from a digital twin API (e.g., 120, FIG. 1) and/or a network data module (e.g., 402, FIG. 4). In one or more embodiments, the network traffic data includes any data relating to network traffic and/or networking resources within the mobile network. In one or more embodiments, the base station data includes power consumption of any portion or all of a base station, frequency bands utilized by any portion or all of a base station, data from power meters capable of averaging measurements over parallel radio-frequency chains feeding antenna ports of a multiple-in-multiple-out-enabled base station, data from on-board power meters capable of providing measurements for each radio-frequency chain over multiple, parallel radio-frequency chains feeding antenna ports of a multiple-in-multiple-out-enabled base station, energy consumption mode schemes, or any other radio-frequency data relating to a base station.

In Step 802, the digital twin generates a network traffic prediction based on the network traffic data and/or base station data. The network traffic prediction may include the predictions generated in Step 606 and/or Step 608.

In Step 804, the sleep control agent generates an updated energy consumption mode scheme for one or more base stations of the digital twin. The updated energy consumption mode scheme may be generated in the same manner Step 704 and/or Step 706.

In Step 806, the digital twin generates a network power metric based on the updated power scheme. The network power metric may be generated in the same manner as Step 710.

In Step 808, the policy module determines an energy consumption mode penalty based on the updated energy consumption mode scheme and a QoS database. In one or more embodiments, energy consumption mode penalty is a measure of the extent to which the KPIs are satisfied based on the updated energy consumption mode scheme. Further, the policy module may maintain a database of policies (e.g., KPIs that should be maintained across some or all of the network) and check to ensure that the updated energy consumption mode scheme emulated on the digital twin complies with the policies maintained by the operator of the mobile network. In one or more embodiments, the energy consumption mode penalty may indicate whether the updated energy consumption mode scheme performed better than previously implemented energy consumption mode schemes.

In Step 810, the policy module determines whether the energy consumption mode penalty is below a threshold. In one or more embodiments, the threshold is either a static threshold or a dynamic threshold. In one or more embodiments, the static threshold may be set by a user. In one or more embodiments, the dynamic threshold changes based on various factors, including the network traffic data, the base station data, user data (e.g., type of user, location of user, user policies, etc.), or any other data relating to the mobile network. If the energy consumption mode penalty is above a threshold, then the method returns to Step 804. In this manner, the method shown in FIG. 8 may be an iterative process that continues to generate energy consumption mode schemes until one is associated with an energy consumption mode penalty below the threshold. In one or more embodiments, the method shown in FIG. 8 iterates any number of times. In one or more embodiments, the method shown in FIG. 8 iterates until a maximum number of times and the energy consumption mode scheme associated with the lowest energy consumption mode penalty is selected for Step 812.

If the energy consumption mode penalty is below a threshold, the method proceeds to Step 812.

In Step 812, the digital twin and/or the policy module adjusts or causes an adjustment of an energy consumption mode scheme of one or more base stations based on the updated energy consumption mode scheme. In one or more embodiments, after the updated energy consumption mode scheme is determined to be acceptable, the updated energy consumption mode scheme is sent to the one or more base stations for the base stations to implement the updated energy consumption mode scheme. As such, the method in FIG. 8 uses a digital twin to enact real changes to the operation of the mobile network.

Turning now to FIG. 9, FIG. 9 shows a diagram of a computing device (900) in accordance with one or more embodiments of the invention.

In one or more embodiments of the invention, the computing device (900) may include one or more computer processors (902), non-persistent storage (904) (e.g., volatile memory, such as RAM, cache memory), persistent storage (906) (e.g., a hard disk, an optical drive such as a CD drive or a DVD drive, a Flash memory, etc.), a communication interface (912) (e.g., Bluetooth interface, infrared interface, network interface, optical interface, etc.), an input device(s) (910), an output device(s) (908), and numerous other elements (not shown) and functionalities. Each of these components is described below.

In one or more embodiments, the computer processor(s) (902) may be an integrated circuit for processing instructions. For example, the computer processor(s) (902) may be one or more cores or micro-cores of a processor. The computing device (900) may also include one or more input devices (910), such as a touchscreen, keyboard, mouse, microphone, touchpad, electronic pen, or any other type of input device. Further, the communication interface (912) may include an integrated circuit for connecting the computing device (900) to a network (e.g., a LAN, a WAN, Internet, mobile network, etc.) and/or to another device, such as another computing device.

In one or more embodiments, the computing device (900) may include one or more output devices (908), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (902), non-persistent storage (904), and persistent storage (906). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A system for enhancing an energy efficiency of a mobile network, the system comprising:
 a digital twin connected to the mobile network, wherein the digital twin is programmed to:
  receive, from the mobile network, real-time network traffic data and base station data of a plurality of base stations operating in the mobile network;
  generate a first prediction of network traffic at a first time-scale based on the real-time network traffic data;
  generate a second prediction of network traffic at a second time-scale based on the real-time network traffic data and the base station data, wherein the second time-scale is shorter than the first time-scale; and
  generate a first power consumption prediction for the mobile network based on the first prediction, the second prediction, and a topology of the mobile network, and
  wherein the digital twin emulates at least a portion of the mobile network.

2. The system of claim 1, wherein the digital twin is further programmed to:
 compute a spatial correlation of traffic demand based on the real-time network traffic data and historical network traffic data; and
 compute a time correlation of traffic demand based on the real-time network traffic data and historical network traffic data, and
 wherein the first prediction is also based on the spatial correlation or the time correlation.

3. The system of claim 2, wherein the first prediction is based on the spatial correlation and the time correlation.

4. The system of claim 1, wherein the base station data comprises current power consumption data of each of the plurality of base stations.

5. The system of claim 1, further comprising a sleep control agent programmed to:
 generate an updated energy consumption mode for the plurality of base stations based on the first prediction and the second prediction.

6. The system of claim 5, wherein the digital twin is further programmed to:
 generate a second power consumption prediction for the mobile network based on the first prediction, the second prediction, the topology, and the updated energy consumption mode; and
 generate a network power metric based on a comparison of the first power consumption prediction and the second power consumption prediction.

7. The system of claim 6, further comprising a policy module programmed to:
 generate an energy consumption mode penalty based on the network power metric and a quality of service metric;
 make a determination that the energy consumption mode penalty is below a threshold; and
 send, based on the determination, a signal to apply the updated energy consumption mode to the plurality of base stations.

8. The system of claim 6, further comprising a policy module programmed to:
 generate a first energy consumption mode penalty based on the network power metric and a quality of service metric;
 make a first determination that the first energy consumption mode penalty is above a threshold;
 wherein the sleep control agent is further programmed to:
  generate a second updated energy consumption mode based on the first determination,
 wherein the digital twin is further programmed to:
  generate a third power consumption prediction for the mobile network based on the first prediction, the second prediction, the topology, and the second updated energy consumption mode; and
  generate a second network power metric based on a comparison of the first power consumption prediction and the third power consumption prediction, and
 wherein the policy module is further programmed to:
  generate a second energy consumption mode penalty based on the second network power metric and the quality of service metric;
  make a second determination that the second energy consumption mode penalty is below a threshold; and
  send a signal to apply the second updated energy consumption mode to the plurality of base stations.

9. The system of claim 8, wherein the sleep control agent is further programmed to:
 update a learning model based on the first determination and the second determination, wherein the learning model is used to generate the updated energy consumption mode and the second updated energy consumption mode.

10. The system of claim 6, wherein the updated energy consumption mode is also based on a proposed network change event, and wherein the digital twin is further programmed to:
 generate an impact prediction based on the network power metric.

11. A method for enhancing an energy efficiency of a mobile network using a digital twin, the method comprising:
 receiving, at the digital twin, network traffic data and base station data of a plurality of base stations of the mobile network;
 computing, by the digital twin, a spatial correlation of traffic demand based on the network traffic data;
 computing, by the digital twin, a time correlation of traffic demand based on the network traffic data;
 generating, by the digital twin, a first prediction of network traffic at a first time-scale based on the spatial correlation and the time correlation;
 generating, by the digital twin, a second prediction of network traffic at a second time-scale based on the network traffic data and the base station data, wherein the second time-scale is different than the first time-scale; and
 performing, based on the first prediction and the second prediction, an energy efficiency enhancement action from an action set.

12. The method of claim 11, wherein the action set comprises:
sending a signal to adjust an energy consumption mode of a base station of the plurality of base stations;
generating an energy consumption mode for the base station, wherein the energy consumption mode comprises setting the base station to: a first energy consumption mode for a first time period and a second energy consumption mode for a second time period; and
generating an impact prediction based on a mobile network change event.

13. The method of claim 11, wherein network traffic data comprises real-time network traffic data and historical network traffic data.

14. The method of claim 11, wherein the second time-scale is shorter than the first time-scale.

15. The method of claim 14, wherein the second time-scale is a at a frame level of at least one of the base stations of the plurality of base stations.

16. The method of claim 11, wherein the base station data comprises power consumption data of the plurality of base stations.

17. The method of claim 11, wherein the time correlation is also based on the spatial correlation.

18. The method of claim 11, further comprising:
generating a first power consumption prediction based on the first prediction and the second prediction and a topology of the mobile network;
generating a second power consumption prediction based on an updated energy consumption mode for the plurality of base stations, and the topology of the mobile network; and
generating a network power metric based on a comparison of the first power consumption prediction and the second power consumption prediction, and wherein the energy efficiency enhancement action is also based on the network power metric.

19. A method for enhancing an energy efficiency of a mobile network using a digital twin, the method comprising:
receiving, at the digital twin and from the mobile network, real-time network traffic data and base station data of a plurality of base stations of the mobile network, wherein the digital twin emulates at least a portion of the mobile network;
generating, by the digital twin, a plurality of predictions of network traffic, wherein each of the plurality of predictions is at a different time-scale and wherein each is based on the real-time network traffic data; and
performing, based on the plurality of predictions, an energy efficiency enhancement action from an action set.

20. The method of claim 19, wherein the action set comprises:
sending a signal to adjust an energy consumption mode of a base station of the plurality of base stations;
generating an energy consumption mode for the base station, wherein the energy consumption mode comprises setting the base station to: a first energy consumption mode for a first time period and a second energy consumption mode for a second time period; and
generating an impact prediction based on a mobile network change event.

* * * * *